United States Patent
Fujioka et al.

(10) Patent No.: US 7,836,794 B2
(45) Date of Patent: Nov. 23, 2010

(54) BOLT FASTENING METHOD AND BOLT FASTENING DEVICE

(75) Inventors: Yasuo Fujioka, Susono (JP); Kazuaki Sato, Gotenba (JP); Yasunori Sakurabayashi, Susono (JP); Hiroshi Teranishi, Susono (JP); Atsuo Tanaka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 69 days.

(21) Appl. No.: 11/920,553

(22) PCT Filed: May 26, 2006

(86) PCT No.: PCT/JP2006/311040

§ 371 (c)(1),
(2), (4) Date: Nov. 16, 2007

(87) PCT Pub. No.: WO2006/126742

PCT Pub. Date: Nov. 30, 2006

(65) Prior Publication Data

US 2009/0064828 A1   Mar. 12, 2009

(30) Foreign Application Priority Data

May 26, 2005   (JP) ............................. 2005-154479

(51) Int. Cl.
   *B25B 13/00* (2006.01)
(52) U.S. Cl. .......................................... 81/52; 73/761
(58) Field of Classification Search .................... 81/52; 73/761; 29/407.02, 407.09, 407.03, 407.1
   See application file for complete search history.

(56) References Cited

U.S. PATENT DOCUMENTS 4,509,394 A * 4/1985 Medlock ....................... 82/128

(Continued)

FOREIGN PATENT DOCUMENTS

EP   0 418 002   3/1991

(Continued)

OTHER PUBLICATIONS

Yasuo Fujioka and Tomotsugu Sakai, Calculated Behavior and Effective Factors for Bolt Self-Loosening Under a Transverse Cyclic Load Generated by a Linearly Vibrating Washer, Proceedings of IMECE2005 (2005 ASME International Mechanical Engineering Congress and Exposition), Nov. 5, 2005.

*Primary Examiner*—D. S Meislin
(74) *Attorney, Agent, or Firm*—Finnegan, Henderson, Farabow, Garrett & Dunner, LLP

(57) ABSTRACT

A bolt fastening method enabling the same effect as when reducing the coefficient of friction of a thread surface without changing the coefficient of friction of the thread surface so as to realize an increase in a bolt axial force generated when fastening the bolt and a bolt fastening device realizing the bolt fastening method are provided.

The bolt fastening method of the present invention is a bolt fastening method for when using a bolt having a bolt head and a bolt shank provided with an external thread to fasten fastened members, characterized by intentionally biasing surface pressures of a thread surface and a bolt bearing surface generated when fastening the bolt by imparting a lateral load parallel to the bolt bearing surface to the bolt head and, in that state, imparting a rotational torque rotating the external thread to the bolt head so as to fasten the bolt.

6 Claims, 10 Drawing Sheets

U.S. PATENT DOCUMENTS

| | | | | |
|---|---|---|---|---|
| 4,691,599 | A * | 9/1987 | Schultz | 81/177.2 |
| 5,392,672 | A * | 2/1995 | Larson et al. | 81/60 |
| 5,469,764 | A * | 11/1995 | Lang | 81/177.2 |
| 6,257,104 | B1 * | 7/2001 | Jarrett | 81/177.8 |
| 2005/0000329 | A1 * | 1/2005 | Pregeant | 81/466 |

FOREIGN PATENT DOCUMENTS

| | | |
|---|---|---|
| JP | 38-28909 | 12/1963 |
| JP | 47-21648 | 6/1972 |
| JP | 2-224934 | 9/1990 |
| JP | 05-77118 | 3/1993 |
| JP | 05-269631 | 10/1993 |
| JP | 07-305712 | 11/1995 |
| JP | 09-21411 | 1/1997 |
| JP | 09-040991 | 2/1997 |
| JP | 10-58248 | 3/1998 |
| JP | 2001-12432 | 1/2001 |
| JP | 3081174 | 8/2001 |
| JP | 2002-235718 | 8/2002 |
| JP | 2004-176901 | 6/2004 |

* cited by examiner

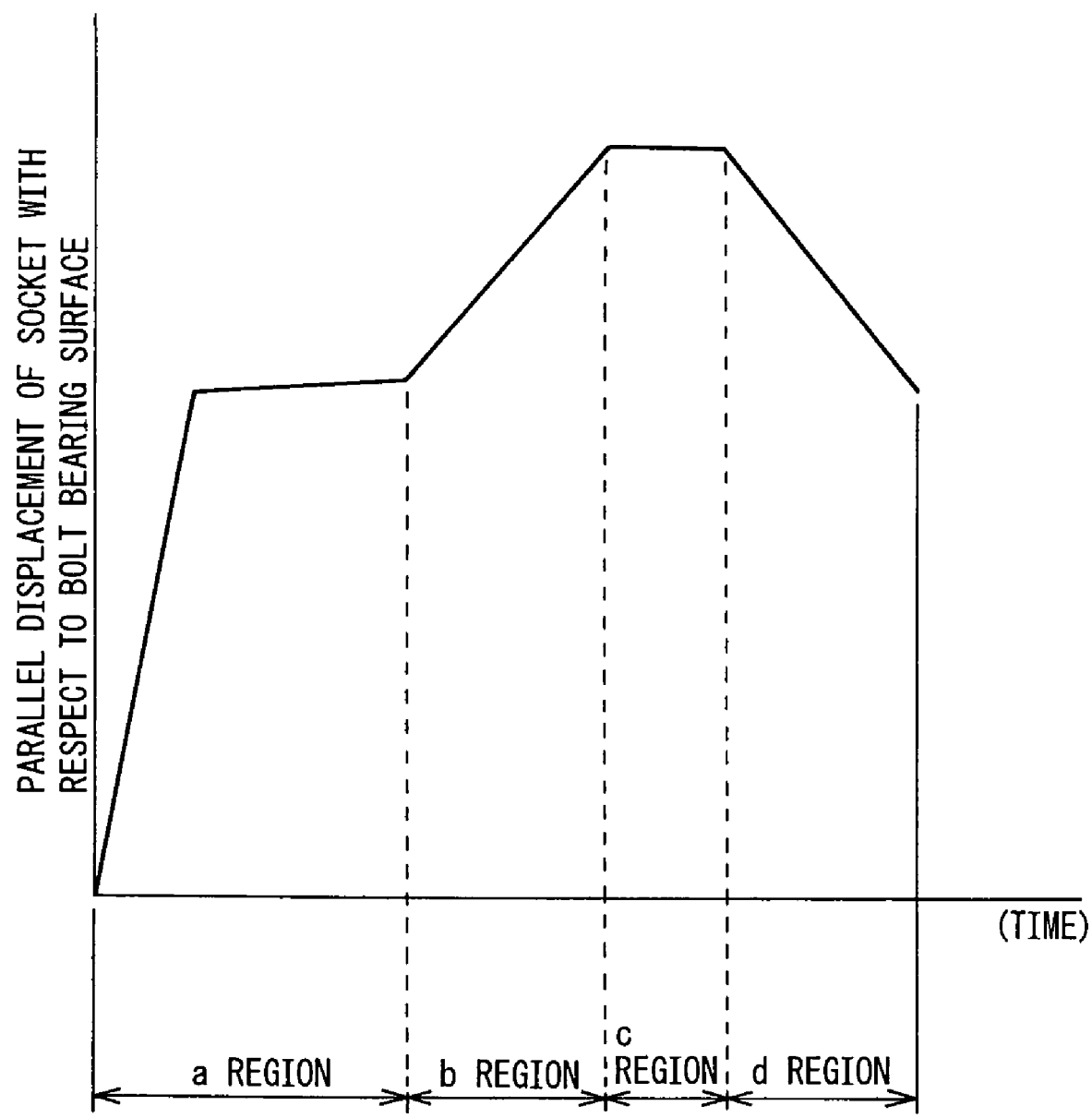

BOLT FASTENING METHOD AND BOLT FASTENING DEVICE

TECHNICAL FIELD

The present invention relates to a bolt fastening method using a bolt to fasten fastened parts and a bolt fastening device realizing the bolt fastening method, more particularly relates to a bolt fastening method applied when fastening fastened parts to prevent slip of fastened parts by frictional grip connection between the fastened parts when a shear force acts on the fastened parts and a bolt fastening device realizing the bolt fastening method.

BACKGROUND ART

As one method for fastening a plurality of fastened parts together, there is the method of using bolts to fasten the fastened parts together. When using a bolt to fasten fastened parts together, in particular using a bolt to fasten fastened parts together so as to prevent slip between fastened parts by frictional grip connection of the fastened parts when a shear force acts, it is important to stabilize the force in the bolt axial direction caused by the fastening of the bolt (hereinafter referred to as the "bolt axial force") high. When the bolt axial force caused by fastening of a bolt is small, sufficient frictional grip connection is not caused between the fastened parts and slip occurs between the fastened parts when the fastened parts receive shear force. This causes rotation and loosening of the bolt and as a result there is for example a strong possibility of problems such as detachment of parts and leakage of liquid due to poor adhesion at the joined faces of the fastened parts.

To keep the bolt axial force caused by fastening a bolt constantly stable, it is known to coat the thread of a bolt with a friction coefficient stabilizer (see Japanese Patent Publication (A) No. 9-40991). Japanese Patent Publication (A) No. 9-40991 shows that by coating a friction coefficient stabilizer on a thread or other fastening member, it is possible to stabilize the coefficient of friction at the time of fastening of the thread and possible to impart any value of coefficient of friction and possible to eliminate problems such as looseness or breakage of fastening members such as threads.

DISCLOSURE OF THE INVENTION

However, when using a friction coefficient stabilizer to stabilize the bolt axial force as shown in Japanese Patent Publication (A) No. 9-40991, a problem remains in the point of increasing the bolt axial force.

When using a bolt to fasten fastened parts, it is necessary to ensure that after bolt fastening, the thread will not easily loosen. At the very least, after bolt fastening, it is believed that the condition that the thread must be self-supporting must be filled.

Here, the expression "the thread is self-supporting" means the state where the phenomenon of, when the bolt external thread is inserted into an internal thread in the vertical direction, the coefficient of friction at the surface where the external thread and internal thread engage (hereinafter referred to as the "thread surface") is too small and the bolt head is not given any rotational torque, but despite this the weight of the bolt itself causes the bolt to end up rotating does not occur.

In the state where the thread is not self-supporting, even if giving the bolt head a rotational torque to fasten the bolt, it is believed that when releasing the rotational torque on the bolt head, the bolt axial force given by the bolt fastening ends up causing the external thread and internal thread to rotate relative to each other and the bolt axial force ends up dropping.

To increase the bolt axial force, when depositing a friction coefficient stabilizer with an extremely small coefficient of friction on the thread and reducing the coefficient of friction of the thread surface itself, the self-support of the thread after bolt fastening becomes a problem. To solve this problem, certain fixed limits would probably have to be imposed in accordance with the design conditions to reduce the coefficient of friction of the thread surface by the friction coefficient stabilizer. Accordingly, certain fixed limits would probably have to be imposed to increase the bolt axial force by use of a friction coefficient stabilizer.

When using a bolt to fasten fastened parts together, the higher the bolt axial force generated at the time of bolt fastening, the stronger the frictional grip connection generated between the fastened parts.

Therefore, when using a bolt to fasten fastened parts while preventing slip between the fastened parts by frictional grip connection between the fastened parts when a shear force acts, discovering a means enabling an increase in the bolt axial force generated when fastening the bolt and not requiring consideration of the point of self-support of the thread after bolt fastening, that is, discovering a means enabling generation of a higher bolt axial force than the bolt axial force generated when using a friction coefficient stabilizer, is believed to be an important issue.

The present invention considers the above problem and has as its object the provision of a bolt fastening method enabling the same effect as when reducing the coefficient of friction of the thread surface without changing the coefficient of friction of the thread surface so as to realize an increase in the bolt axial force generated when fastening the bolt and a bolt fastening device realizing the bolt fastening method, which bolt fastening method and bolt fastening device realizing the bolt fastening method being excellent in work efficiency and easily workable.

According to an aspect of the invention, there is provided a bolt fastening method for when using a bolt having a bolt head and a bolt shank provided with an external thread to fasten fastened members, the bolt fastening method characterized by intentionally biasing surface pressures of a thread surface and a bolt bearing surface generated when fastening the bolt by imparting a lateral load parallel to the bolt bearing surface to the bolt head and, in that state, imparting a rotational torque rotating the external thread to the bolt head so as to fasten the bolt.

When using a bolt to fasten fastened members, a lateral load parallel to the bolt bearing surface is imparted to the bolt head so as to bias the surface pressures of the thread surface and the bolt bearing surface and, in that state, a rotational torque for rotating the external thread of the bolt is imparted to fasten the bolt.

By imparting a predetermined lateral load parallel to the bolt bearing surface to the bolt head and while doing so imparting a rotational torque to the bolt head to fasten the bolt, it is possible to make the bolt axis incline with respect to the vertical line of the bolt bearing surface by a predetermined angle, while an extremely slight angle, and further making the bolt head incline with respect to the bolt bearing surface by a predetermined angle, while an extremely slight angle, to fasten the bolt. Accordingly, it is possible to bias the surface pressures of the thread surface and the bolt bearing surface generated when fastening a bolt to the desired state.

By intentionally biasing the surface pressures of the thread surface and the bolt bearing surface generated when fastening the bolt to the desired state, it is possible to make the actual center axis of rotation of the bolt when fastening a bolt move from the center axis of the bolt to the direction of the high surface pressure side of the thread surface and the bolt bearing surface. Due to this, it is possible to reduce the fastening rotational torque of the bolt and the torsional stress generated at the thread and sufficiently bring out the allowable tensile stress of the thread to increase the limit bolt axial force where yield occurs and possible to realize an increase in the bolt axial force.

Further, after the bolt finishes being fastened and the rotational torque which had been imparted to the bolt head is released, it is possible to maintain the engagement of the external thread and internal thread by the frictional force generated in accordance with the coefficient of friction of the thread surface itself. Due to this, it becomes possible to give a higher bolt axial force compared with when using a friction coefficient stabilizer without any of the restrictions on the increase of the bolt axial force due to the self-support of the thread which became a problem when using a friction coefficient stabilizer to increase the bolt axial force.

Here, the "thread surface" means the surface where the external thread of the bolt and the internal thread corresponding to the external thread engage. The "bolt bearing surface" means the surface where a fastened member and the bolt head contact. Further, when for example a flat washer, spring washer, or other washer is arranged between the bolt head and the fastened member, it means the surface where the washer and bolt or the washer and fastened member contact.

According to another aspect of the invention, there is provided a bolt fastening method, characterized in that an internal thread engaged with the external thread is arranged with a center axis of the internal thread inclined with respect to a vertical line of the bolt bearing surface.

By arranging the center axis of the internal thread engaged with the external thread of the bolt inclined by a predetermined angle with respect to the vertical line of the bolt bearing surface, it is possible to fasten the bolt while making the bolt axis incline by a predetermined angle with respect to the vertical line of the bolt bearing surface and making the bolt head incline by a predetermined angle with respect to the bolt bearing surface. Due to this, compared with when the center axis of the internal thread engaged with the external thread of the bolt is arranged parallel to the vertical line of the bolt bearing surface, it is possible to bias the surface pressures of the thread surface and the bolt bearing surface generated when fastening the bolt to the desired state by imparting a smaller lateral load to the bolt head.

According to another aspect of the, there is provided a bolt fastening method, characterized by making the center axis of the internal thread engaged with the external thread incline with respect to the vertical line of the bolt bearing surface by having particles deposited at parts of the threads of the internal thread.

Particles are deposited at predetermined parts of the threads of the internal thread engaging with the external thread of the bolt so as to make the center axis of the internal thread incline with respect to the vertical line of the bolt bearing surface.

According to another aspect of the invention, there is provided a bolt fastening method, characterized in that the external thread is formed with the center axis of the external thread inclined with respect to the center axis of the bolt head.

By forming the center axis of the external thread of the bolt inclined by a predetermined angle with respect to the center axis of the bolt head, it is possible to fasten the bolt while inclining the bolt head by a predetermined angle with respect to the bolt bearing surface. Due to this, compared with when using a bolt where the center axis of the external thread and the center axis of the bolt head of the bolt match, it becomes possible to bias the surface pressures of the thread surface and the bolt bearing surface generated when fastening the bolt to the desired state by imparting a smaller lateral load to the bolt head.

According to another aspect of the invention, there is provided a bolt fastening method, characterized in that the bolt shank is formed with a hole in part of it to reduce a bending rigidity of the bolt shank with respect to the lateral load.

By providing a suitable hole in the bolt shank, it is possible to reduce the bending rigidity of the bolt shank with respect to the lateral load parallel to the bolt bearing surface. Due to this, compared with when using a bolt without such a hole in the bolt shank, it is possible to bias the surface pressures of the thread surface and the bolt bearing surface generated when fastening the bolt to the desired state by imparting a smaller lateral load to the bolt head.

According to another aspect of the invention, there is provided a bolt fastening method, characterized in that the lateral load imparted in parallel to the bolt bearing surface is controlled so as to intentionally bias the surface pressures of the thread surface and the bolt bearing surface and enable the bolt to be fastened in the state where the bolt head is sliding in parallel with respect to the bolt bearing surface.

When fastening a bolt, it is possible to intentionally bias the surface pressures of the thread surface and the bolt bearing surface and fasten the bolt in the state where the bolt head is sliding in parallel to the bolt bearing surface. Due to this, for example, it is possible to prevent a lateral load from being excessively imparted to the bolt head and therefore the bolt shank from strongly being pushed against the rim of a bolt hole provided in a fastened member and therefore unexpectedly large friction from being generated due to the surface conditions of the contact part between the bolt shank and the rim of the bolt hole. Further, it is possible to reduce more the fastening rotational torque required when fastening a bolt and possible to further increase the bolt axial force generated when fastening the bolt.

According to another aspect of the invention, there is provided a bolt fastening device used when using a bolt having a bolt head and a bolt shank provided with an external thread so as to fasten fastened members, the bolt fastening device characterized by comprising a fastening rotational torque imparting means for imparting a rotational torque rotating the external thread to the bolt head and a lateral load imparting means for imparting a lateral load parallel to a bolt bearing surface to the bolt head so as to intentionally bias surface pressures of a thread surface and the bolt bearing surface generated when the fastening rotational torque imparting means rotates the external thread.

Since the bolt fastening device has a fastening rotational torque imparting means for imparting to the bolt head a rotational torque rotating the external thread of the bolt and a lateral load imparting means for imparting to the bolt head a lateral load parallel to the bolt bearing surface so as to intentionally bias the surface pressures of the thread surface and the bolt bearing surface when the fastening rotational torque imparting means rotates the external thread of the bolt, when using the bolt to fasten fastened members, it becomes possible to fasten the bolt while imparting to the bolt head a rotational torque rotating the external thread of the bolt in the state biasing the surface pressures of the thread surface and the bolt bearing surface. Due to this, it is possible to bias the surface pressures of the thread surface and the bolt bearing surface generated when fastening the thread to the desired state and possible to move the actual center axis of rotation of the bolt when fastening a bolt from the bolt axis to the direction of the high surface pressure side of the thread surface and bolt bearing surface. Due to this, it is possible to reduce the torsional stress generated at the thread and sufficiently bring out the allowable tensile stress of the thread to raise the limit bolt axial force where yield occurs and to increase the bolt axial force.

Further, after the bolt finishes being fastened and the rotational torque which had been imparted to the bolt head is released, the engagement between the external thread and internal thread can be maintained by the frictional force generated in accordance with the coefficient of friction of the thread surface itself and, compared with use of a friction coefficient stabilizer, a higher bolt axial force can be generated.

According to another aspect of the invention, there is provided a bolt fastening device, characterized in that the lateral load imparting means comprises a displacement detecting means for detecting parallel movement of the bolt head with respect to the bolt bearing surface when the fastening rotational torque imparting means fastens the bolt and a lateral load controlling means for controlling the lateral load based on parallel movement of the bolt head with respect to the bolt bearing surface detected from the displacement detecting means and the lateral load controlling means controls the lateral load so as to intentionally bias the surface pressures of the thread surface and the bolt bearing surface when fastening the bolt and enable fastening of the bolt in the state where the bolt head is sliding in parallel to the bolt bearing surface.

Since the lateral load imparting means has a displacement detecting means and lateral load controlling means, when fastening the bolt, it is possible to intentionally bias the surface pressures of the thread surface and the bolt bearing surface and fasten the bolt in the state where the bolt head is sliding in parallel to the bolt bearing surface.

According to the aspects of the invention, there are the common effects that it is made possible to fasten a bolt in the state intentionally biasing the surface pressures of the thread surface and the bolt bearing surface, and an increase in the bolt axial force is realized without changing the coefficient of friction itself of the thread.

Therefore, according to the aspects of the invention, it becomes possible to give a higher bolt axial force compared with when using a friction coefficient stabilizer without any of the restrictions on the increase of the bolt axial force due to the self-support of the thread which became a problem when using a friction coefficient stabilizer to increase the bolt axial force.

BRIEF DESCRIPTION OF THE DRAWINGS

FIG. 13 is a view of an example of parallel movement of a socket with respect to a bolt bearing surface when the control routine of bolt fastening shown in FIG. 12 is performed, that is, the trend in displacement over time.

BEST MODE FOR CARRYING OUT THE INVENTION

Below, several embodiments of the present invention will be explained with reference to the attached drawings.

First, the basic concept of the bolt fastening method of the present invention will be explained with reference to FIG. 1 and FIG. 2.

Figure 1:
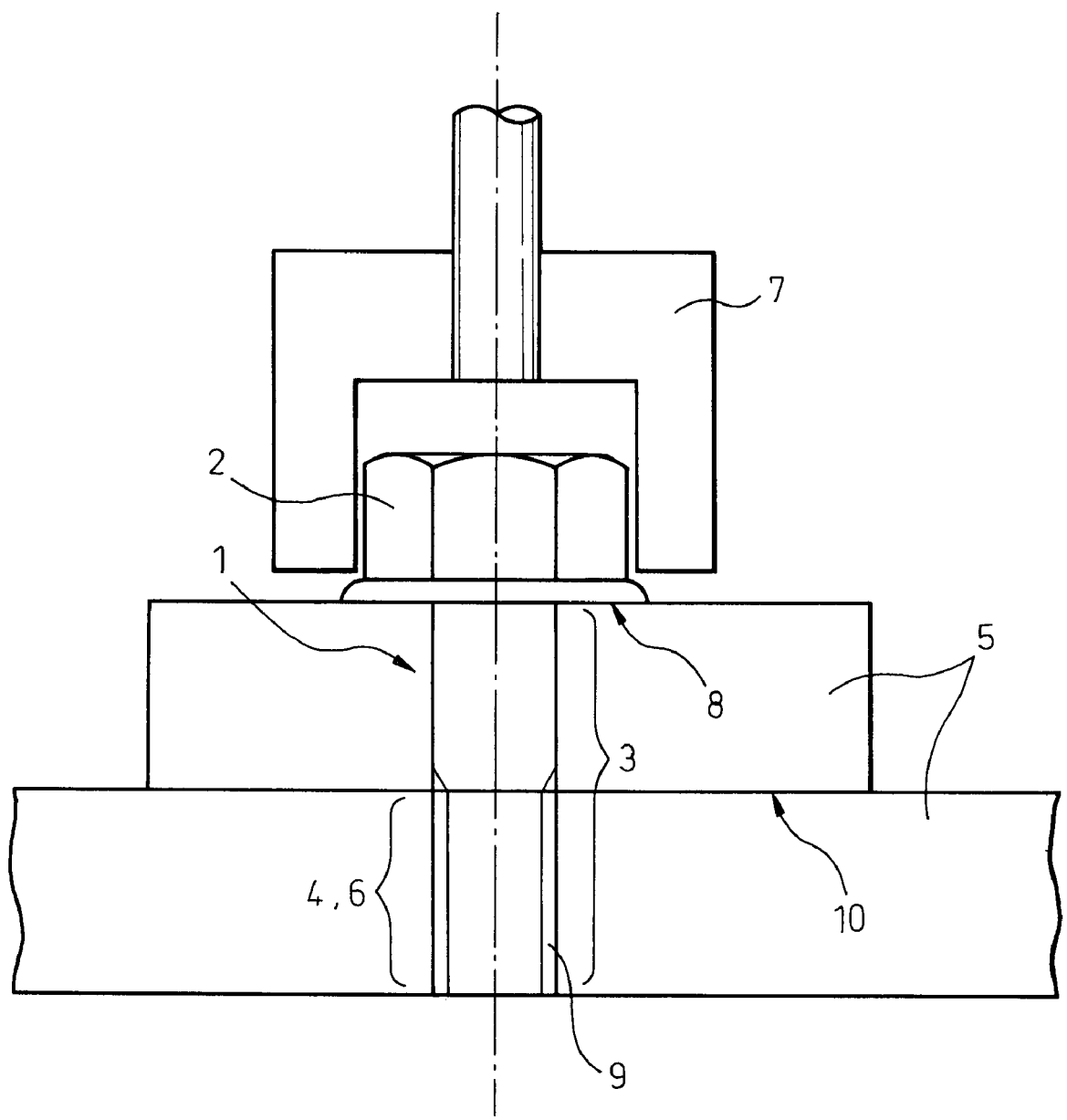
FIG. 1 is a view showing a state of a bolt before a lateral load parallel to a bolt bearing surface is imparted to a bolt head.

FIG. 1 is a view showing one state of a bolt before a lateral load parallel to the bolt bearing surface is imparted to a bolt head. In FIG. 1, 1 indicates a bolt, 2 a bolt head, 3 a bolt shank, 4 an external thread provided at the bolt shank 3, 5 fastened parts, 6 an internal thread engaged with the external thread, 7 a socket transmitting rotational torque to the bolt head 2, 8 a bolt bearing surface forming a surface where the bolt head 2 and a fastened part 5 engage, 9 a thread surface forming a surface where the external thread 4 and internal thread 6 engage, and 10 a frictional engagement surface between fastened parts.

Figure 2:
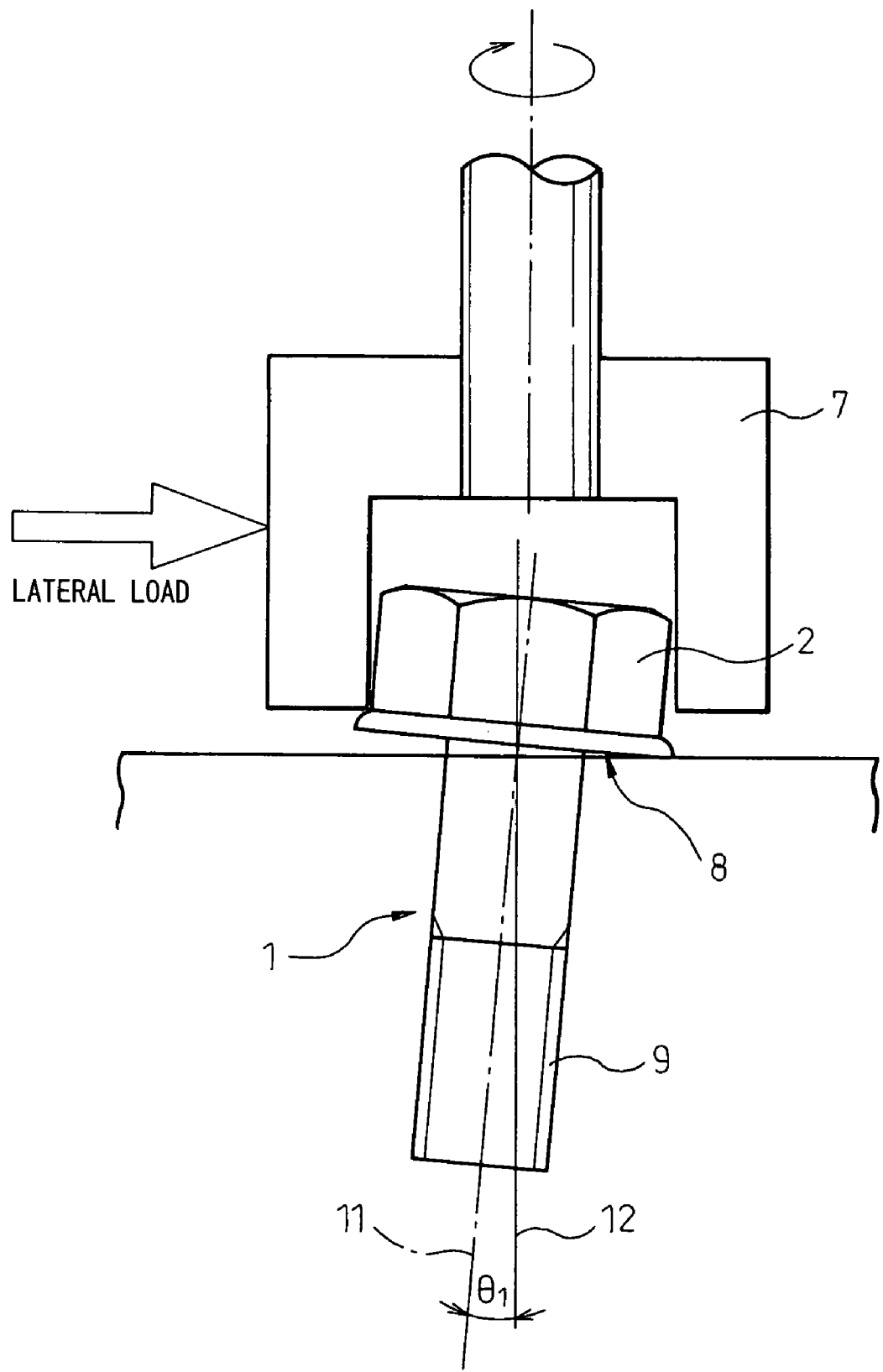
FIG. 2 is a view showing the state of a bolt when a lateral load parallel to a bolt bearing surface is imparted to a bolt head from the state shown in FIG. 1 and further a rotational torque making the bolt head rotate is imparted to a socket.

FIG. 2 is a view showing the state of a bolt when a lateral load parallel to the bolt bearing surface 8 is imparted to the bolt head 2 from the state shown in FIG. 1 and further a rotational torque making the bolt head 2 rotate is imparted to the socket 7.

As shown in FIG. 2, when a lateral load parallel to the bolt bearing surface 8 is imparted to the bolt head 2 through the socket 7, the bolt axis 11 is inclined with respect to the vertical line of the bolt bearing surface 12 and, further, the bolt head 2 is inclined with respect to the bolt bearing surface 8. Note that FIG. 2 is drawn so as to clarify these inclined states, but in actuality the angle θ1 of these inclinations is an extremely slight angle of for example 0.01°.

If, in this state, that is, in the state where the bolt axis 11 is inclined with respect to the vertical line of the bolt bearing surface 12 and, further, the bolt head 2 is inclined with respect to the bolt bearing surface 8, a rotational torque is imparted through the socket 7 to the bolt head 2, the bolt is fastened in the state with the surface pressures of the bolt bearing surface 8 and thread surface 9 are biased.

The applicant discovered by the finite element method (FEM) that by fastening a bolt 1 while imparting a lateral load parallel to the bolt bearing surface 8 to the bolt head 2 in order to bias the surface pressures of the bolt bearing surface 8 and thread surface 9, it is possible to make the actual center axis of rotation of the bolt (also called the "instantaneous center axis of rotation") move from the bolt axis 11 in the direction of the high surface pressure side of the thread surface 9 and bolt bearing surface 8. Therefore, it is possible to generate a higher bolt axial force with a smaller fastening torque in comparison to when a lateral load to the bolt head 2 is not imparted.

In deriving this, the applicant first verified by the finite element method the behavior of the rotational torque required for fastening a bolt when imparting a shear type load to the fastened parts fastened by the bolt.

In imparting a shear type load to the fastened members fastened by a bolt, it is known that the phenomenon of the bolt easily ending up rotating, that is, looseness of the bolt, occurs. Further, there is the theory that this phenomenon is due to the drop in the coefficient of friction in the rotational direction around the bolt axis. According to this, when there is lateral slip at both of the thread surface and bolt bearing surface, the coefficient of friction in the rotational direction around the bolt axis falls to an extremely small 0.005 to 0.02 and this causes looseness of the bolt.

The applicant formed analysis models corresponding to the case of imparting and the case of not imparting a shear type load to the fastened members fastened by a bolt while setting the constraining condition that the coefficient of friction of the bolt bearing surface and thread surface be maintained not at the extremely small value of 0.005 to 0.02, but at a realistic coefficient of friction of the bolt bearing surface and thread surface, for example, a coefficient of friction of about 0.1, so as to verify this theory.

As a result, the applicant learned that in the state where the fastened members are given a shear type load and the surface pressures of the bolt bearing surface and thread surface are given bias, the coefficient of friction of the bolt bearing surface and thread surface is maintained at the inherent coefficient of friction, but despite this, that is, even if the coefficient of friction of the bolt bearing surface and thread surface is not an extremely small value of 0.005 to 0.02, by making the center axis of rotation of the bolt move from the bolt axis to the direction of the high pressure part side, the torque required for making the bolt rotate falls compared with the case where the fastened members are not given a shear type load.

From this, the applicant derived the basic concept that the phenomenon of a bolt ending up easily rotating in the state where the fastened members fastened by the bolt are given a shear type load is not due to the drop in the coefficient of friction in the rotational direction around the bolt axis, but is due to the bias in the surface pressures of the bolt bearing surface and thread surface due to the shear type load being imparted and, further, that due to the bias of the surface pressures of the bolt bearing surface and thread surface, the actual center axis of rotation of the bolt moves from the bolt axis in the direction approaching the high surface pressure part of the bolt bearing surface and thread surface and, due to this, the torque required for making the bolt rotate declines.

The actual center axis of rotation of the bolt imparted by the bias of the surface pressures of the bolt bearing surface and thread surface is believed to ideally become the line connecting the high surface pressure part of the bolt bearing surface and the high surface pressure part of the thread surface. The reason why is that probably the high part of surface pressure has difficulty moving and the bolt rotates about the high surface pressure part. However, the bias of the surface pressures of the bolt bearing surface and thread surface is probably not caused to be concentrated at a single point. Generally, it is caused with a distribution over a certain area.

Therefore, the actual center axis of rotation of the bolt caused by the bias of the surface pressures of the bolt bearing surface and thread surface should be considered to become the line connecting the part of the bolt bearing surface close to the high pressure part and the part of the thread surface close to the high pressure part.

Further, the actual center axis of rotation of the bolt caused by the bias of the surface pressures of the bolt bearing surface and thread surface is considered to become the line connecting the part near the high pressure part of the bolt bearing surface and the part near the high pressure part of the thread surface. The actual center axis of rotation of the bolt moves from the bolt axis in the direction approaching the high surface pressure part. The shortest distance from the actual center axis of rotation of the bolt to the high surface pressure part becomes shorter. Due to this, the explanation for the phenomenon of the rotational torque required for making the bolt rotate becoming smaller can be easily derived. If assuming that the actual center axis of rotation of the bolt moves from the high surface pressure part in the direction away from it, the shortest distance from the center axis of rotation of the bolt to the high surface pressure part should become longer and the torque required for making the bolt rotate should increase. This is inconsistent with the results of analysis.

Next, the applicant used the finite element method to verify the behavior of the surface pressures of the bolt bearing surface 8 and thread surface 9 and the rotational torque required for making the bolt 1 rotate in the state imparting lateral load parallel to the bolt bearing surface 8 to the bolt head 2 for the purpose of verifying if this basic concept can be applied to a bolt fastening method so as to increase the bolt axial force when fastening a bolt.

In this verification, the applicant formed analysis models corresponding to the case of imparting and the case of not imparting a lateral load parallel to the bolt bearing surface 8 to the bolt head 2 while setting the constraining condition that the coefficient of friction of the bolt bearing surface 8 and thread surface 9 be maintained not at the extremely small value of 0.005 to 0.02, but at a realistic coefficient of friction of the bolt bearing surface 8 and thread surface 9, for example, a coefficient of friction of about 0.1.

As a result, the applicant learned that in the state when imparting a lateral load to the bolt head 2 to bias the surface pressures of the bolt bearing surface 8 and the thread surface 9, similar to the case where the fastened members are given a shear type load, the coefficient of friction of the bolt bearing surface 8 and thread surface 9 is maintained at the inherent coefficient of friction, but despite this, that is, even if the coefficient of friction of the bolt bearing surface 8 and thread surface 9 is not an extremely small value of 0.005 to 0.02, by making the center axis of rotation of the bolt move from the bolt axis 11 to the high pressure part side direction, the torque required for making the bolt rotate falls compared with the case where the bolt head 2 is not given a lateral load.

Therefore, this basic concept can be applied to a bolt fastening method. By imparting a lateral load parallel to the bolt bearing surface 8 to the bolt head 2 and fastening the bolt 1 in the state biasing the surface pressures of the bolt bearing surface 8 and thread surface 9 generated when fastening the bolt 1, it is possible to make the actual center axis of rotation of the bolt move from the bolt axis 11 to the direction of the high surface pressure side by the bias of the surface pressures of the bolt bearing surface 8 and thread surface 9. Due to this, it is believed verified that compared with when not imparting a lateral load to the bolt head 2, a smaller fastening rotational torque can be used to fasten a bolt.

Next, the fact that by reducing the fastening rotational torque required when fastening a bolt, it becomes possible to increase the bolt axial force generated when fastening a bolt will be explained.

At the time of bolt fastening, the bolt shank is acted on by the torsional stress τ corresponding to the fastening rotational torque of the bolt and the tensile stress σ corresponding to the bolt axial force. The equivalent stress $\sigma_e$ after these are combined is generally expressed by an elliptical equation of $\sigma_e^2 = (\sigma^2 + 3\tau^2)$ and is treated as elastic deformation until reaching the yield point $\sigma_y$ of the bolt material.

Therefore, to raise the limit bolt axial force where the bolt yields, it is sufficient to reduce the torsional stress τ generated when fastening a bolt. Reduction of the rotational torque required when fastening a bolt means reduction of the torsional stress τ generated when fastening a bolt. The allowable range of tensile stress σ corresponding to the bolt axial force is increased. This means an increase in the limit bolt axial force where the bolt yields. Compared with the case of not imparting a lateral load to the bolt head 2, a higher bolt axial force can be given.

As explained above, according to the bolt fastening method of the present invention, by changing the fastening method without changing the coefficient of friction itself, specifically, by fastening the bolt in the state giving bias to the surface pressures of the bolt bearing surface 8 and thread surface 9, the same effect is exhibited as when reducing the coefficient of friction of the thread surface 9, that is, the effect is exhibited of realizing an increase of the bolt axial force when fastening the bolt 1.

Further, the bolt 1 finishes being fastened and the fastening rotational torque imparted to the bolt head 2 is released, it is possible to maintain the engagement between the external thread and internal thread by the frictional force generated in accordance with the coefficient of friction of the thread surface 9 itself.

Due to this, it becomes possible to give a higher bolt axial force compared with when using a friction coefficient stabilizer without any of the restrictions on the increase of the bolt axial force due to the self-support of the thread which became a problem when using a friction coefficient stabilizer to increase the bolt axial force.

The higher bolt axial force causes a strong frictional grip connection on the frictional engagement surface 10 between the fastened parts. Due to this strong frictional grip connection, the slip between fastened parts when a shear force acts can be more completely prevented. Accordingly, it becomes possible to avoid slip between fastened parts and more completely prevent looseness of the thread.

In the bolt fastening method according to the present invention, when finishing fastening the bolt, the bolt head 2 and the bolt bearing surface 8 may have a clearance, though extremely slight, remaining between them. However, the clearance remaining after the bolt finishes being fastened is believed to substantially disappear by the bolt itself moving to become balanced when the rotational torque which had been imparted to the bolt head 2 is released or when a shear force acts on the fastened part. Except for dealing with a connection part where a rotational torque frequently acts on the bolt such as for example the hinge part of eyeglasses, the effect of that clearance with respect to the bolt axial force can be ignored.

Further, in the bolt fastening method according to the present invention, when fastening a bolt, the external thread is inserted into the corresponding internal thread inclined, so depending on the degree of inclination, thread seizing may become a problem. In this case, by applying a friction coefficient stabilizer to the thread surface to an extent where the self-support of the thread after bolt fastening will not become a problem, the thread seizing can be eased.

Next, several embodiments applying the basic concept of the above bolt fastening method of the present invention will be explained below.

Figure 3:
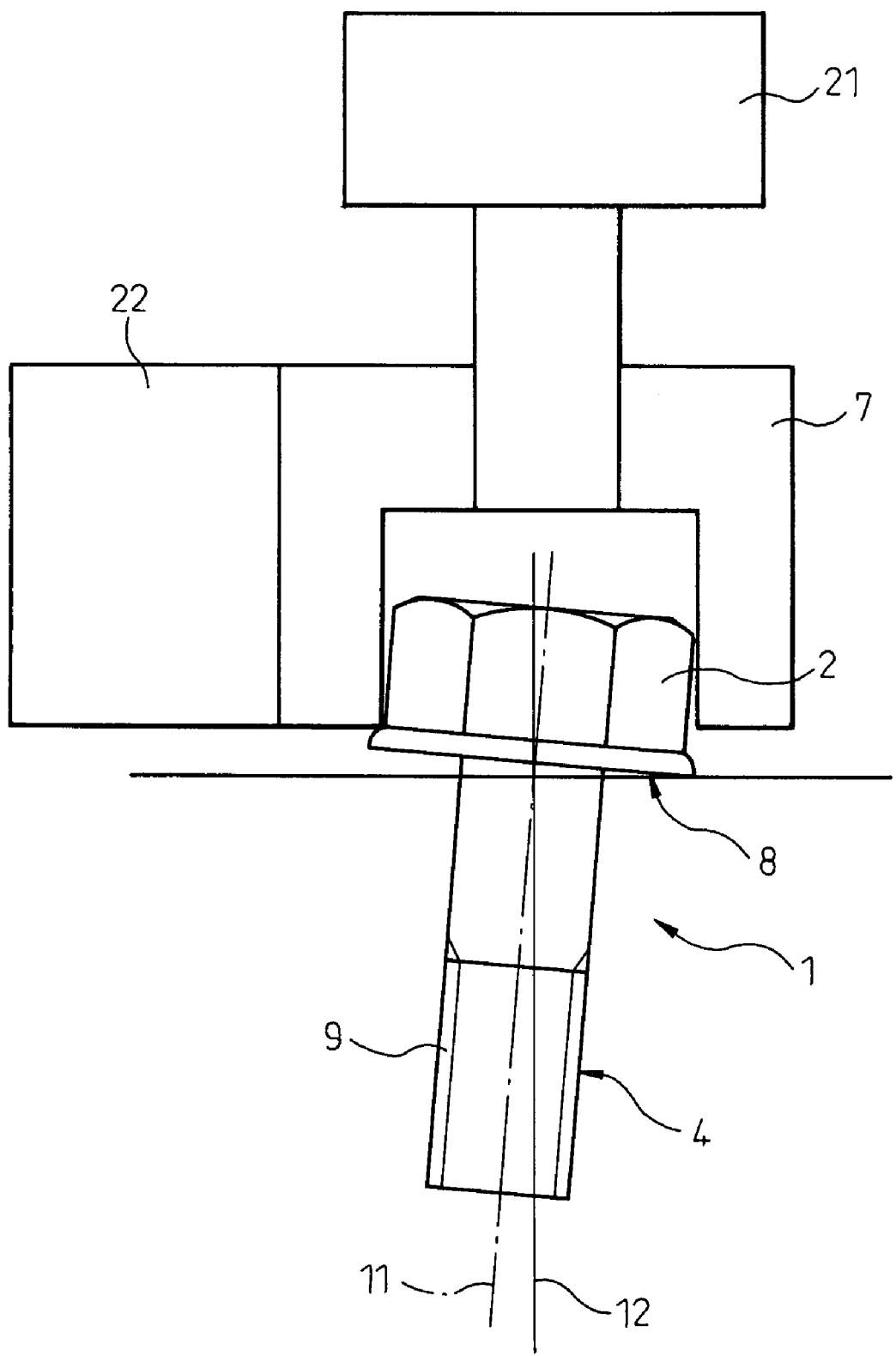
FIG. 3 is a view of a first embodiment for realizing the bolt fastening method of the present invention.

FIG. 3 shows a first embodiment for realizing the bolt fastening method of the present invention, in which figure, 21 indicates a fastening rotational torque imparting means and 22 a lateral load imparting means.

The first embodiment shown in FIG. 3 shows the most basic configuration for realizing the bolt fastening method of the present invention. The bolt 1 is a usually used headed bolt, for example, a hexagonal bolt. The fastening rotational torque imparting means 21 performs the function of imparting the fastening rotational torque required for bolt fastening to the bolt head 2, while the lateral load imparting means 22 performs the function of imparting a lateral load parallel to the bolt bearing surface 8 constantly in one direction through the socket 7 to the bolt head 2 when using the fastening rotational torque imparting means 21 to fasten the bolt 1.

By providing the fastening rotational torque imparting means 21 and lateral load imparting means 22, it becomes possible to impart a lateral load parallel to the bolt bearing surface 8 to the bolt head 2 and, in that state, impart a rotational torque for rotating the external thread 4 to the bolt head 2 so as to fasten the bolt. Accordingly, it is possible to make the bolt axis 11 incline with respect to the vertical line of the bolt bearing surface by a predetermined angle, while an extremely slight angle, and the bolt head 2 incline with respect to the bolt bearing surface 8 by a predetermined angle, while an extremely slight angle. Thus, it is possible to bias the surface pressures of the thread surface 9 and the bolt bearing surface 8 generated when fastening bolt 1 to the desired state.

Figure 4:
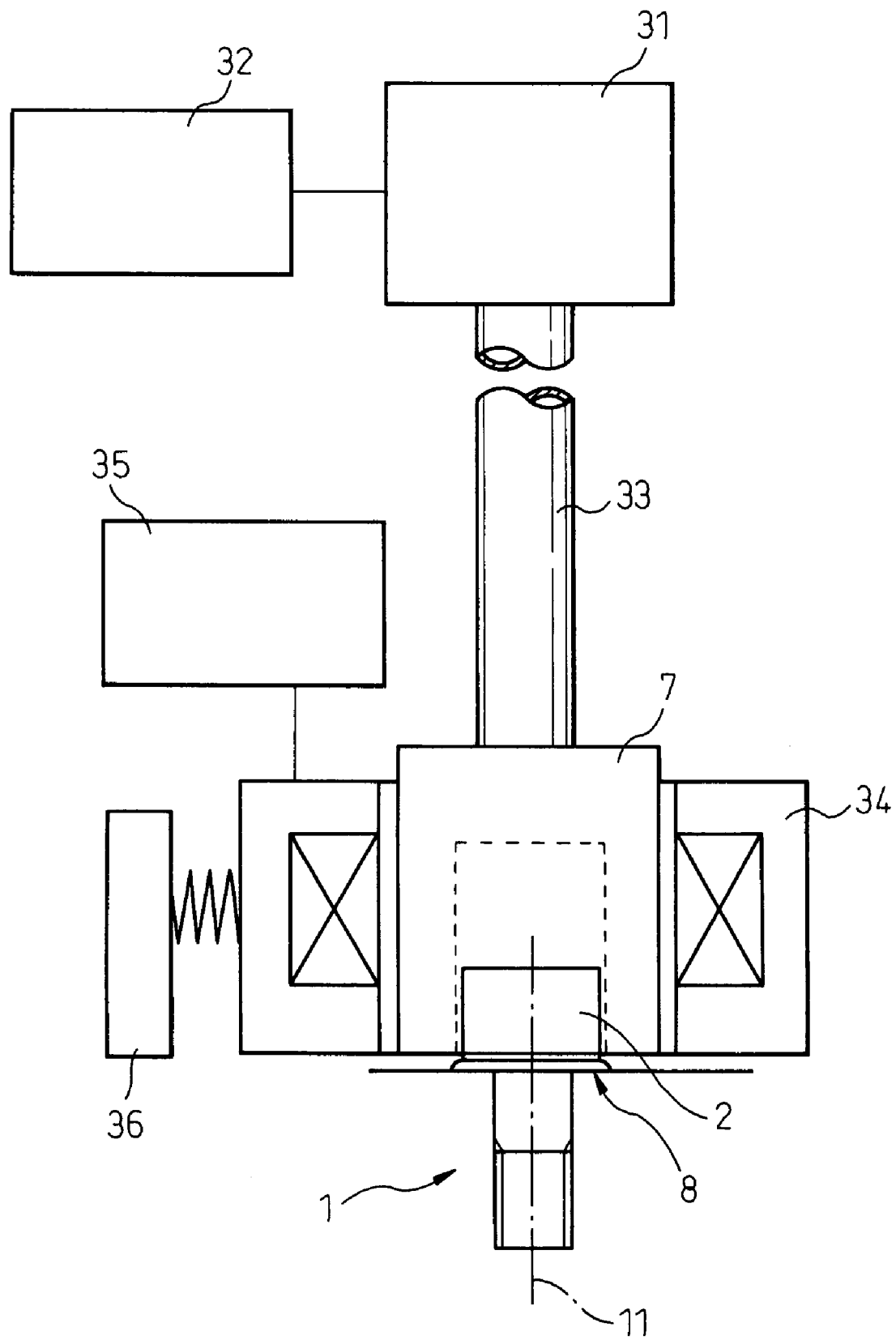
FIG. 4 is a view of a more specific embodiment of a fastening rotational torque imparting means and lateral load imparting means of the first embodiment shown in FIG. 3.

A more specific embodiment of the fastening rotational torque imparting means 21 and lateral load imparting means 22 is shown in FIG. 4. In FIG. 4, 31 indicates a rotation drive, 32 a rotation controller, 33 a rotating shaft, 34 an electromagnet device, 35 a lateral load control unit, and 36 a reaction force receiver.

In the embodiment shown in FIG. 4, the fastening rotational torque imparting means 21 has a rotation drive 31, rotation controller 32, and shaft 33. The rotation drive 31 performs the function of generating the fastening rotational torque required when fastening the bolt 1. An electric power or compressed air type or other type of rotation drive can be used. The rotation controller 32 performs the function of controlling the magnitude of the fastening rotational torque generated by the rotation drive 31. The shaft 33 performs the function of transmitting the fastening rotational torque generated by the rotation drive 31 to the socket 7.

By the fastening rotational torque imparting means 21 having the rotation drive 31 and shaft 33, it becomes possible to transmit a fastening rotational torque from the rotation drive 31 through the shaft 33 to the socket 7 when fastening the bolt. Further, by having the rotation controller 32, it is possible to control the magnitude of the fastening rotational torque transmitted to the socket 7 and due to this possible to prevent the transmission of an excess fastening rotational torque which might damage the bolt 1 to the socket 7.

In the embodiment shown in FIG. 4, the lateral load imparting means 22 has an electromagnet device 34, lateral load control unit 35, and reaction force receiver 36. The electromagnet device 34 performs the function of imparting a lateral load parallel to the bolt bearing surface 8 constantly in one direction to the socket 7 to forcibly make the socket 7 move parallel to the bolt bearing surface 8. The lateral load control unit 35 performs the function of controlling the magnitude of the lateral load imparted to the socket 7 by the electromagnet device 34. The reaction force receiver 36 performs the function of preventing relative movement of the electromagnet device 34 with respect to the bolt bearing surface 8. When fastening a bolt, if the electromagnet device 34 is temporarily fastened to the fastened member, the reaction force receiver becomes unnecessary.

By the lateral load imparting means 22 having the electromagnet device 34 and reaction force receiver 36, it is possible to forcibly make the socket 7 move parallel to the bolt bearing surface 8. Accordingly, it becomes possible to make the bolt axis 11 incline with respect to the vertical line of the bolt bearing surface 12 by a predetermined angle, while an extremely slight angle, and make the bolt head 2 incline with respect to the bolt bearing surface 8 by a predetermined angle, while an extremely slight angle.

Further, by the lateral load imparting means 22 having the lateral load control unit 35, it is possible to control the magnitude of the lateral load imparted to the socket 7 and the timing of imparting the lateral load. At the initial stage of bolt fastening, the rotational torque for making the bolt 1 rotate is small and it is believed that there is no need to impart a lateral load to the socket 7. As the final stage of bolt fastening is approached, the rotational torque required for making the bolt 1 rotate gradually becomes larger. It is preferable to control the magnitude of the lateral load imparted to the socket 7 in accordance with this change of the rotational torque. By having this lateral load control unit 35, this control becomes possible.

Figure 5:
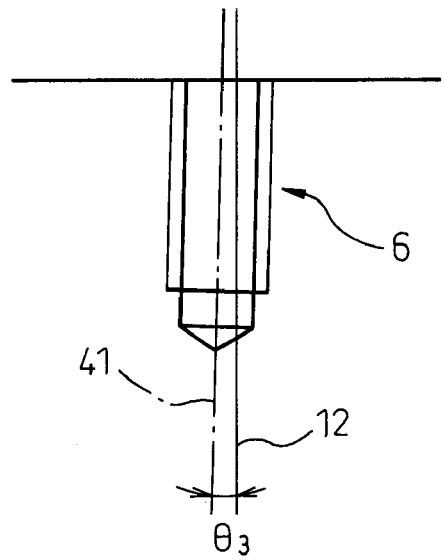
FIG. 5 is a view of an internal thread in a second embodiment for realizing the bolt fastening method of the present invention.

A second embodiment for realizing the bolt fastening method of the present invention is particularly characterized by the structure of the internal thread 6 engaged with the external thread 4 of the bolt 1. The internal thread 6 in the second embodiment is shown in FIG. 5. Other components are similar to those of the first embodiment shown in FIG. 3. The actions and effects are also similar.

The internal thread 6 in the second embodiment shown in FIG. 5 is arranged so that the center line 41 of the internal thread 6 has an angle θ3 with respect to the vertical line 12 of the bolt bearing surface. Due to this, when the fastening rotational torque imparting means 21 fastens the bolt 1, the bolt axis 11 can be made to incline with respect to the vertical line 12 of the bolt bearing surface by an angle θ3 and the bolt head 2 can be made to incline with respect to the bolt bearing surface 8 by an angle to fasten the bolt 1. Accordingly, compared with the case where the center axis 41 of the internal thread engaging with the external thread 4 of the bolt 1 is arranged parallel to the vertical line 12 of the bolt bearing surface, it is possible to bias the surface pressures of the thread surface 9 and bolt bearing surface 8 generated when fastening the bolt 1 to the desired state by imparting a smaller lateral load to the bolt head 2.

Figure 6:
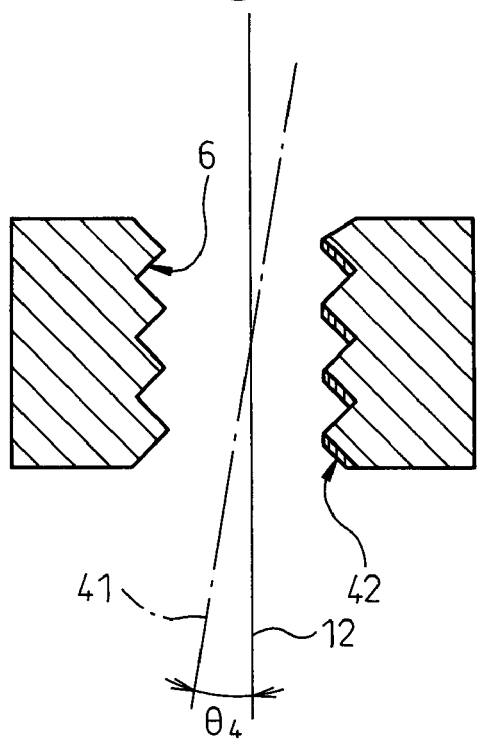
FIG. 6 is a view of an internal thread in a third embodiment for realizing the bolt fastening method of the present invention.

The third embodiment for realizing the bolt fastening method of the present invention, like the second embodiment, is particularly characterized by the structure of the internal thread 6 engaging with the external thread 4 of the bolt 1. The internal thread 6 in the third embodiment is shown in FIG. 6. Other components are similar to those of the first embodiment shown in FIG. 3. The actions and effects are also similar.

The internal thread 6 at the third embodiment shown in FIG. 6 is formed with preferably particles deposited at the semicircular part of one side of the thread so that the center axis 41 of the internal thread 6 engaging with the external thread 4 has an angle θ4 with respect to the vertical line 12 of the bolt bearing surface, like the second embodiment. When the particles are deposited by deposition at the semicircular part of one side, the surface pressure of the thread surface generated when fastening a bolt can be distributed so that the portion of half of the circumference of the thread is made the high surface pressure part and the portion of the remaining half is made the low surface pressure part. Further, the particles may be deposited at suitable locations of the threads of the internal thread 6 so as to give the high surface pressure part at the desired location of the thread surface 9 when fastening the bolt 1. Regarding the particles used, to precisely realize the inclination of the center axis 41 of the internal thread 6, preferably fine particles of a metal or a polymer are used. The action and effect caused by the center axis 41 of the internal thread 6 having an angle θ4 with respect to the vertical line of the bolt bearing surface 12 are similar to those of the second embodiment.

Figure 7:
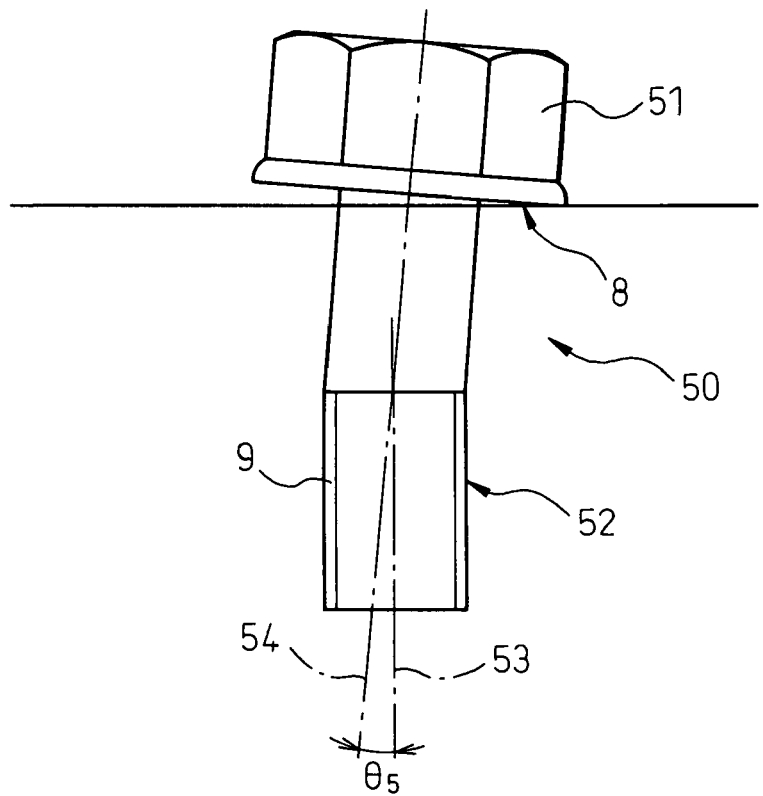
FIG. 7 is a view of an external thread in a fourth embodiment for realizing the bolt fastening method of the present invention.

The fourth embodiment for realizing the bolt fastening method of the present invention is particularly characterized by the structure of the bolt. The bolt of the fourth embodiment is shown in FIG. 7. In FIG. 7, 50 indicates a bolt, 51 a bolt head, 52 an external thread, 53 a center axis of the bolt head 51, and 54 a center axis of the external thread 52.

As shown in FIG. 7, the external thread 52 in the fourth embodiment is formed with the center axis 53 of the external thread having an angle with respect to the center axis 54 of the bolt head. Due to this, when the fastening rotational torque imparting means fastens the bolt 50, it is possible to make the bolt head 51 incline with respect to the bolt bearing surface 8 as well by an angle and fasten the bolt 50. Accordingly, compared to the case where the center axis of the bolt head is arranged parallel to the vertical line of the bolt bearing surface, it becomes possible to bias the surface pressures of the thread surface 9 and bolt bearing surface 8 generated when fastening the bolt 50 to the desired state by imparting a smaller lateral load to the bolt head 51.

In the fourth embodiment, the center axis 54 of the bolt head is inclined with respect to the center axis 53 of the external thread, so unlike the first embodiment to the third embodiment, when rotating and fastening the bolt 50, the engaged parts of the bolt head 51 and the bolt bearing surface 8 rotate and move along with the rotation of the bolt 50. Therefore, to impart a lateral load in the direction of the engaged parts of the bolt head 51 and the bolt bearing surface 8, it is necessary to synchronize the direction of imparting a lateral load imparted to the bolt head 51 with the rotation of the bolt 50. An embodiment of the bolt fastening device able to realize this lateral load will be explained below with reference to FIG. 8 and FIG. 9.

Figure 8:
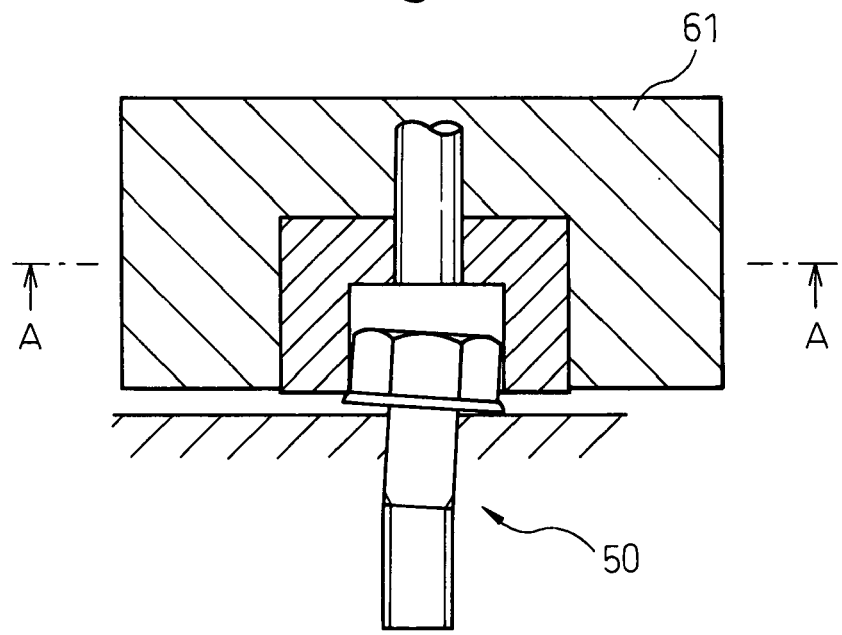
FIG. 8 is an assembly diagram of a bolt of the fourth embodiment and a rotation hammer forming a bolt fastening device able to synchronize a direction of imparting a lateral load imparted to a bolt head with rotation of the bolt.
Figure 9:
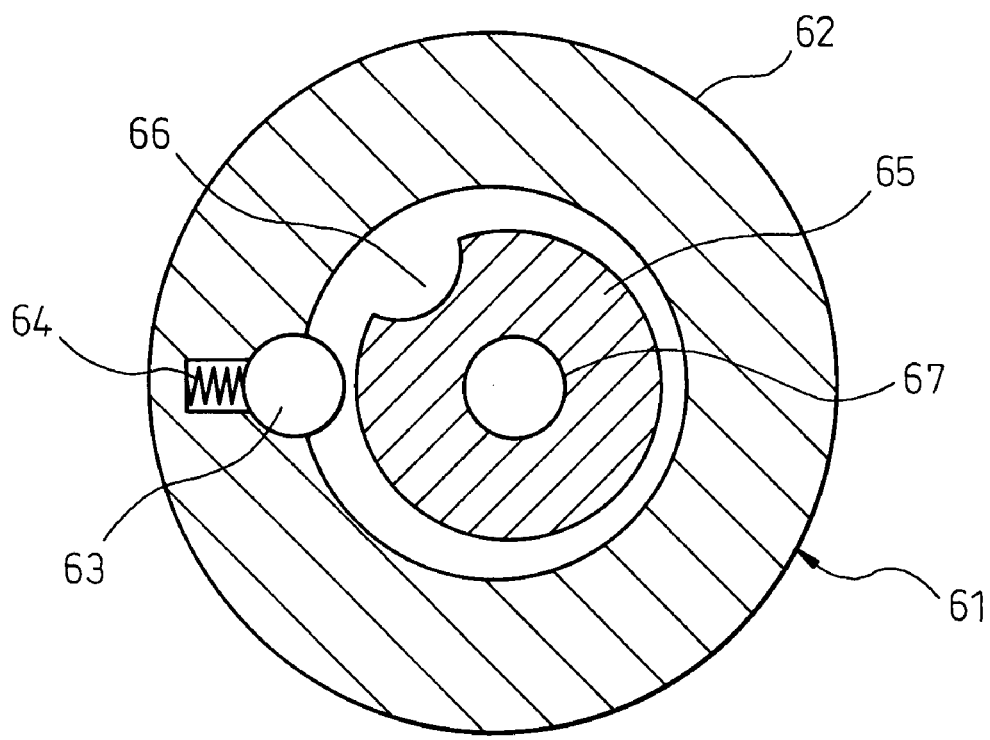
FIG. 9 is a cross-sectional view of a rotation hammer device along the line A-A of FIG. 8.

FIG. 8 is an assembly diagram of a bolt 50 of the fourth embodiment and a rotation hammer device as a bolt fastening device able to synchronize the direction of imparting a lateral load to the bolt head 51 with the rotation of the bolt 50. Further, FIG. 9 is a cross-sectional view of a rotation hammer device along the line A-A of FIG. 8. In FIG. 8 and FIG. 9, 61 indicates a rotation hammer device, 62 a hammer, 63 a roller bearing, 64 a spring, 65 a socket, 66 a groove, and 67 a rotating shaft.

The rotation hammer device 61 has a hammer 62, socket 65, and shaft 67. Further, the hammer 62 has a roller bearing 63 and a spring 64. The socket 65 performs the function of imparting to the bolt head 51 a rotational torque required when fastening the bolt 50. The outside surface of the socket 65 is provided with a groove 66 striking and engaging with the later explained roller bearing 63. The hammer 62 performs the function of imparting to the bolt head 51 a lateral load simultaneous with transmission of the fastening rotational torque through the socket 65 and has a spring 64 and a roller bearing 63. The shaft 67 performs the function for forming the center axis of rotation of the socket 65.

The spring 64 performs the role of biasing the roller bearing 63 toward the socket 65. One end is fastened to the hammer 62, while the other end is fastened to the roller bearing 63. The roller bearing 63 performs the function of striking and engaging with the groove 66 of the socket 65 by the biasing force of the spring 64 and simultaneously imparting to the socket 65 a rotational torque and lateral load imparted to the bolt head 51.

Below, the operation of the rotation hammer device 61 will be explained with reference to FIG. 9.

When the hammer 62 is rotated with respect to the socket 65, the roller bearing 63 rotates together with the hammer 62 and encounters the groove 66 of the socket 65. At this time, the roller bearing 63 strikes and engages with the groove 66 of the socket 65 due to the biasing force of the spring 64. Due to this, the socket 65 can be simultaneously given the rotational torque required for fastening the bolt 50 and the lateral load required for pushing the socket 65 in parallel to the bolt bearing surface 8.

At the initial stage of fastening where the rotational force required for fastening the bolt 50 is low, the roller bearing 63 and the groove 66 of the socket 65 engage and the roller bearing is pushed against the groove 66 by the spring 64. By rotating the socket 65 together with the hammer in that state, the bolt head 51 is given a fastening rotational torque and lateral load.

Further, if the rotational torque required for fastening the bolt 50 becomes higher and exceeds a certain value, the roller bearing 63 is disengaged from the groove 66 and slides on the outside surface of the socket 65 along with the hammer 62 until again encountering the groove 66. When again encountering the groove 66, the roller bearing 63 strikes and engages with the groove 66 of the socket 65 by the biasing force of the spring 64. Due to this, it is possible to simultaneously impart a rotational torque about the shaft 67 to the socket 65 and a lateral load pushing the socket 65 parallel to the bolt bearing surface 8. By repeatedly executing this operation, the bolt 50 can be completely fastened.

By using the rotation hammer device 61 in this way, the direction of the lateral load given to the bolt head 51 can be synchronized with the rotation of the bolt 50. Even in the case of the fourth embodiment where when fastening the bolt 50, the engagement surfaces of the bolt head 51 and bolt bearing surface 8 move along with rotation of the bolt, the bolt fastening method of the present invention can be realized.

Further, this rotation hammer device 61 itself becomes a large weight and probably can receive the reaction force generated by imparting a lateral load to the bolt head 2 by the weight of the rotation hammer device 61 itself. Accordingly, the embodiment shown in FIG. 8 does not include as a component the reaction force receiver for preventing relative movement of the rotation hammer device 61 with respect to the bolt bearing surface 8 when fastening the bolt. However, when the rotation hammer device 61 itself is light in weight and the reaction force receiver is necessary, the reaction force receiver is provided in accordance with need.

In the second embodiment to the fourth embodiment, even if not imparting a lateral load to the bolt head by external force, when fastening a bolt, it is possible to make the bolt axis incline with respect to the vertical line of the bolt bearing surface by an angle and/or make the bolt head incline with respect to the bolt bearing surface by an angle. However, when fastening a bolt without imparting a lateral load by external force, there is a strong possibility that the bolt itself will be fastened while accompanied with deformation balancing the high surface pressure part and the low surface pressure part of the thread surface and bolt bearing surface generated when fastening the bolt, that is, while accompanied with deformation eliminating the bias of the surface pressures, so it is hard to impart a high surface pressure part to the desired region.

To prevent this deformation of the bolt itself, it is considered necessary to forcibly impart a lateral load to the head of a bolt by a certain external force. Accordingly, in the bolt fastening methods of the second embodiment to the fourth embodiment as well, imparting a lateral load to the bolt head by external force when fastening the bolt is made a requirement. However, depending on the design conditions or the conditions of the fastening environment, in the second embodiment to the fourth embodiment, it is considered possible to easily impart a high surface pressure part to the desired region without imparting a lateral load by external force. In such a case, there is no longer a need to impart a lateral load to the bolt head by external force and therefore the bolt fastening work can be facilitated and streamlined.

Figure 10:
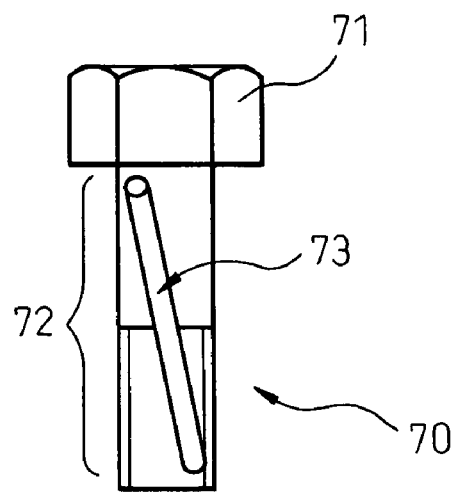
FIG. 10 is a view of an external thread in a fifth embodiment for realizing the bolt fastening method of the present invention.

A fifth embodiment for realizing the bolt fastening method of the present invention is particularly characterized by the structure of the bolt. A bolt of the fifth embodiment is shown in FIG. 10. In FIG. 10, 70 indicates a bolt, 71 a bolt head, 72 a bolt shank, and 73 a hole.

As shown in FIG. 10, the bolt shank 72 of the bolt 70 in the fifth embodiment is formed with a hole 73 in part of it. The hole 73 performs the function of lowering the bending rigidity of the bolt shank 72 with respect to the lateral load imparted to the bolt head 71. Its shape and the number of the same etc. are suitably determined according to the design specifications. For example, the hole 73 may also run through the bolt shank 72. Further, it may also be a recess provided in the side surface of the bolt shank 73 and not passing through the bolt shank 73.

By the bolt shank 72 having the hole 73, compared with when a bolt shank does not have a hole, the bolt shank 72 easily bends and deforms with respect to the lateral load imparted to the bolt head 71. Accordingly, compared with when using a bolt with a bolt shank without a hole, it becomes possible to bias the surface pressures of the thread surface and the bolt bearing surface generated when fastening the bolt 70 to the desired state by imparting a smaller lateral load to the bolt head 71.

Below, a sixth embodiment for realizing the bolt fastening method of the present invention will be explained. In this embodiment, the lateral load imparting means for imparting a lateral load parallel to the bolt bearing surface to the bolt head is characterized by having a displacement detecting means for detecting parallel movement of the bolt head with respect to the bolt bearing surface and a lateral load controlling means for controlling the above lateral load based on the parallel movement of the bolt head with respect to the bolt bearing surface detected from the displacement detecting means.

In the bolt fastening method of the present invention, when fastening a bolt, by imparting a lateral load parallel to the bolt bearing surface to the bolt head, it is possible to fasten the bolt by a smaller fastening rotational torque, but depending on the situation, sometimes this effect cannot be sufficiently obtained. For example, sometimes a lateral load parallel to the bolt bearing surface is excessively imparted to the bolt head and therefore the bolt shank is strongly pushed against the rim of the bolt hole provided in a fastened member and unexpectedly large friction is generated due to the surface conditions of the contact parts of the bolt shank and rim of the bolt hole. In this state, it is believed that the effect of imparting a lateral load parallel to the bolt bearing surface to the bolt head while fastening the bolt by a smaller fastening rotational torque cannot be sufficiently obtained.

Based on this, in the sixth embodiment, the lateral load imparting means has the above displacement detecting means and the above lateral load controlling means, so when fastening a bolt, it becomes possible to intentionally bias the surface pressures of the thread surface and the bolt bearing surface and fasten the bolt in the state where the bolt head is sliding in parallel to the bolt bearing surface. In the state where the bolt head is sliding in parallel to the bolt bearing surface, the bolt shank will probably not be strongly pushed against the rim of the bolt hole provided in a fastened member. Further, there will probably also not be any contact between the bolt body portion and other locations besides the rim of the bolt hole which would greatly obstruct the reduction of the fastening rotational torque of the bolt.

Accordingly, according to the sixth embodiment where the lateral load imparting means has the above displacement detecting means and the above lateral load controlling means and thereby, when fastening a bolt, it is possible to intentionally bias the surface pressures of the thread surface and the bolt bearing surface and fasten the bolt in the state where the bolt head is sliding in parallel to the bolt bearing surface, it is possible to prevent for example a lateral load parallel to the bolt bearing surface from being excessively imparted to the bolt head and therefore the bolt shank from being strongly pushed against the rim of a bolt hole provided at a fastened member and unexpectedly large friction from being generated due to the surface conditions of the contact part of the bolt shank and the rim of the bolt hole.

Further, it is known that when the object surface slides straight by translational force, the apparent coefficient of friction of the object when adding rotational force becomes extremely small. That is, it is known that when the object slides straight, compared with the case of rotating the object when the object is stationary, a smaller rotational torque can be used to make the object rotate.

Accordingly, when fastening the bolt, even under a situation where imparting a lateral load parallel to the bolt bearing surface to the bolt head does not cause a state of bias of the surface pressures of the thread surface and the bolt bearing surface, according to the sixth embodiment where the lateral load imparting means has the above displacement detecting means and the above lateral load controlling means and therefore can fasten the bolt in the state where the bolt head is sliding in parallel to the bolt bearing surface, it is possible to reduce more the fastening rotational torque required when fastening a bolt compared with the case of fastening a bolt in the state where the bolt head does not slide in parallel to the bolt bearing surface and possible to increase the bolt axial force given when fastening a bolt.

Figure 11:
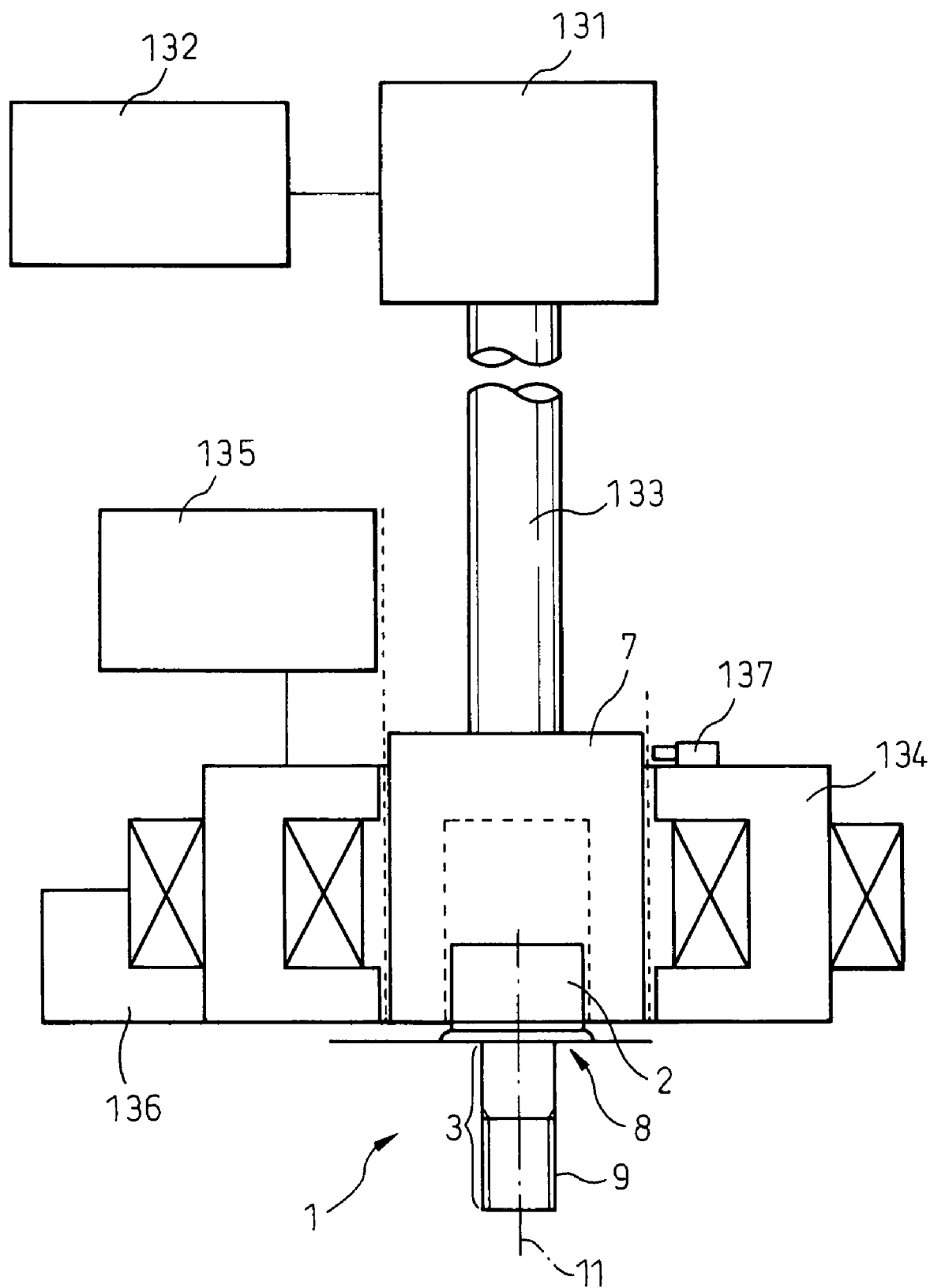
FIG. 11 is a view of a sixth embodiment for realizing the bolt fastening method of the present invention.

FIG. 11 is a view of a sixth embodiment for realizing a method of fastening a bolt of the present invention. In FIG. 11, 131 indicates a rotation drive, 132 a rotation controller, 133 a rotating shaft, 134 an electromagnet device, 135 a lateral load control unit, 136 a reaction force receiver, and 137 a displacement sensor.

In the embodiment shown in FIG. 11, the fastening rotational torque imparting means performing the function of imparting to the bolt head 2 a fastening rotational torque required when fastening the bolt has a rotation drive 131, rotation controller 132, and shaft 133. The rotation drive 131 performs the function of generating the fastening rotational torque required when fastening the bolt 1. An electric power type, compressed air type, or other type of rotation drive can be used. The rotation controller 132 performs the function of controlling the magnitude of the fastening rotational torque generated by the rotation drive 131. The shaft 133 performs the function of transmitting the fastening rotational torque generated by the rotation drive 131 to the socket 7.

Since the fastening rotational torque imparting means has the rotation drive 131 and shaft 133, when fastening a bolt, the fastening rotational torque can be transmitted from the rotation drive 131 through the shaft 133 to the socket 7. Further, since it has the rotation controller 132, the magnitude of the fastening rotational torque transmitted to the socket 7 can be controlled. Due to this, it becomes possible to prevent transmission of excess fastening rotational torque which would damage the bolt 1 to the socket 7.

In the embodiment shown in FIG. 11, the lateral load imparting means performing the function of imparting a lateral load parallel to the bolt bearing surface 8 through the socket 7 to the bolt head 2 when the fastening rotational torque imparting means fastens the bolt 1 has a displacement detecting means and a lateral load controlling means.

The displacement detecting means performs the function of detecting the parallel movement of the bolt head 2 with respect to the bolt bearing surface 8 when the fastening rotational torque imparting means fastens the bolt 1. In this embodiment, the displacement detecting means has a displacement sensor 137 for detecting the amount of parallel movement of the socket 7 with respect to the bolt bearing surface 8 when the bolt 1 is fastened, that is, the amount of displacement, and detects the parallel movement of the bolt head 2 with respect to the bolt bearing surface 8 based on the information detected from the displacement sensor 137, for example the state of change of the amount of displacement etc.

The lateral load controlling means performs the function of controlling the lateral load parallel to the bolt bearing surface 8 imparted to the bolt head 2 based on the parallel movement of the bolt head 2 with respect to the bolt bearing surface 8 detected by the above displacement detecting means. In this embodiment, the lateral load controlling means has an electromagnet device 134, lateral load control unit 135, and reaction force receiver 136.

The electromagnet device 134 performs the function of imparting a lateral load parallel to the bolt bearing surface 8 to the socket 7 and forcibly making the socket 7 move parallel to the bolt bearing surface 8. The electromagnet device 134 is configured so as to be able to impart a lateral load parallel to the bolt bearing surface from any direction to the socket 7. Due to this, a lateral load parallel to the bolt bearing surface 8 can be imparted from any direction to the bolt head 2.

The lateral load control unit 135 performs the function of controlling the magnitude of the lateral load imparted to the socket 7 by the electromagnet device 3 based on the parallel movement of the bolt head 2 with respect to the bolt bearing surface 8 detected by the above displacing means. Specifically, the lateral load control unit 135 controls the lateral load imparted to the socket 7 so as to, when fastening the bolt 1, intentionally bias the surface pressures of the thread surface 9 and bolt bearing surface 8 and fasten the bolt 1 in the state with the bolt head 2 sliding parallel with respect to the bolt bearing surface 8.

The reaction force receiver 136 performs the function of preventing relative movement of the electromagnet device 134 with respect to the bolt bearing surface 8. In this embodiment, it is configured so that, when fastening a bolt, the electromagnet device 134 is temporarily fastened along the shape of the fastened member.

Figure 12:
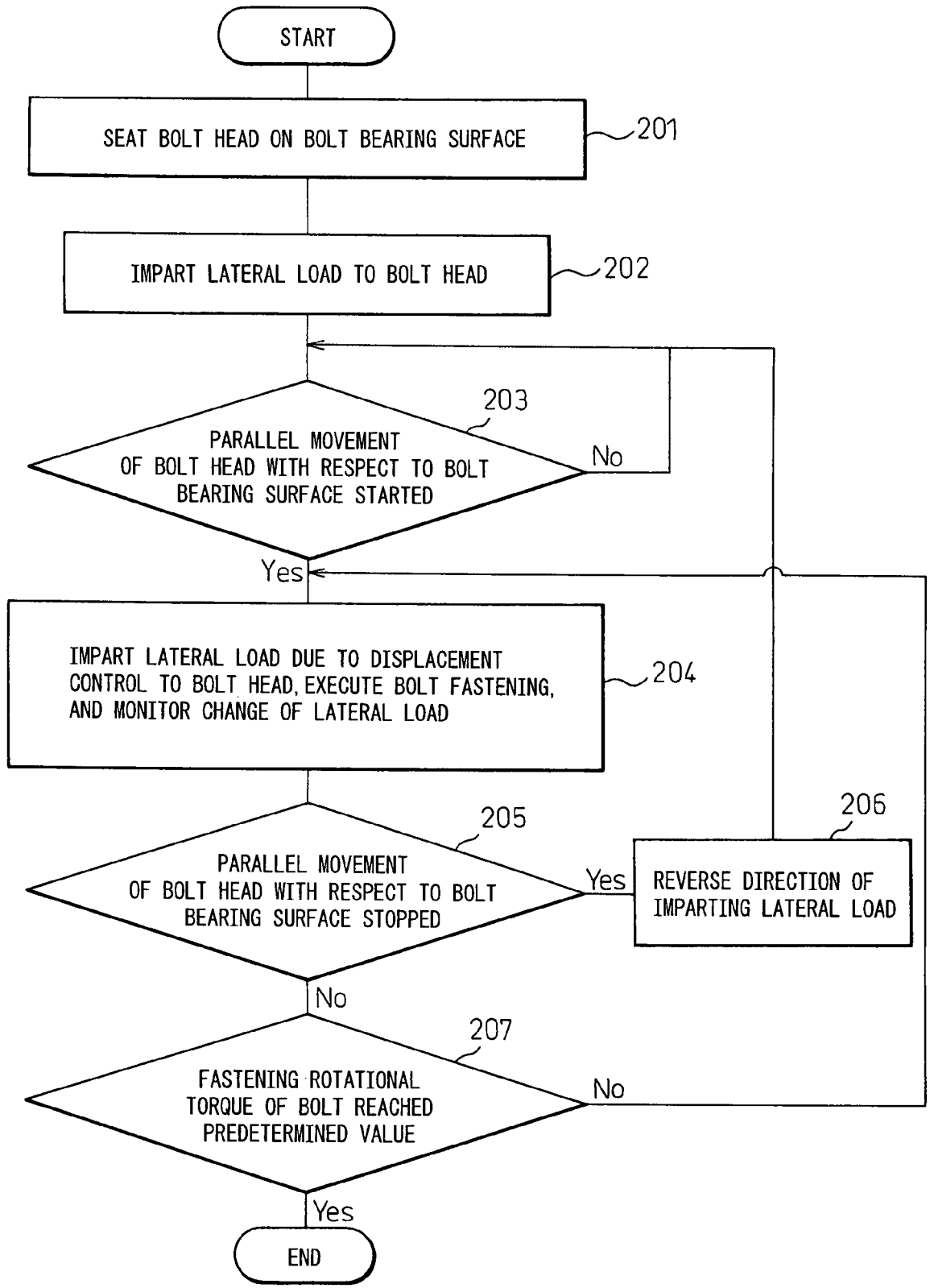
FIG. 12 is a flow chart showing an embodiment of a control routine for bolt fastening performed in the bolt fastening device according to the present invention shown in FIG. 11.

Below, an embodiment of the control routine for fastening a bolt executed by the bolt fastening device shown in FIG. 11 meeting the above requirements will be explained. FIG. 12 is a flow chart showing an embodiment of the control routine for fastening a bolt executed by the bolt fastening device according to the present invention shown in FIG. 11.

In the control routine for bolt fastening shown in FIG. 12, the lateral load imparting means imparts a lateral load to the bolt head 2. Based on the detection information from the displacement sensor 137, the existence of any parallel movement of the bolt head 2 with respect to the bolt bearing surface 8 is detected. When in a state with such movement, the bolt head 2 is given a lateral load by the displacement control and the bolt is fastened. Further, during bolt fastening, if it is judged that there is no longer any parallel movement of the bolt head 2 with respect to the bolt bearing surface 8, the lateral load controlling means performs control so as to change the direction in which the lateral load is imparted to the bolt head 2 so as to cause parallel movement of the bolt head 2 with respect to the bolt bearing surface 8. For example, it performs control so as to make the direction of the lateral load imparted to the bolt head 2 a direction completely reverse to the direction of the lateral load which had been imparted up to then. Due to this, when fastening a bolt, it becomes possible to intentionally bias the surface pressures of the thread surface and the bolt bearing surface and fasten the bolt in the state where the bolt head is sliding in parallel to the bolt bearing surface. Below, the steps shown in FIG. 12 will be explained.

At step 201, the bolt head 2 is seated on the bolt bearing surface 8 so that the bolt head 2 and the bolt bearing surface 8 contact each other. Further, when the bolt head 2 and the bolt bearing surface 8 have a washer etc. arranged between them, the bolt head 2 is seated so that the bolt head 2 contacts the washer etc. If the bolt head 2 is seated on the bolt bearing surface 8 at step 201, the routine proceeds to step 202.

At step 202, the lateral load imparting means imparts a lateral load parallel to the bolt bearing surface 8 to the bolt head 2. Specifically, by the lateral load imparting means imparting a lateral load parallel to the bolt bearing surface 8 to the socket 7 and the lateral load being transmitted through the socket 7 to the bolt head 2, a lateral load parallel to the bolt bearing surface 8 is imparted to the bolt head 2. At step 202, when the lateral load starts to be imparted to the bolt head 2, the routine proceeds to step 203.

At step 203, based on the detection information from the displacement sensor 137, the existence of any parallel movement of the bolt head 2 with respect to the bolt bearing surface 8 is detected and the start of the movement is confirmed. Specifically, the displacement sensor 137 detects the amount of parallel movement of the socket 7 with respect to the bolt bearing surface 8 per μm unit, that is, the amount of displacement. Based on the state of change of the amount of displacement, the fact that the parallel movement of the bolt head 2 with respect to the bolt bearing surface 8 has started, or there is such movement, is confirmed. Here, the state where there is parallel movement of the bolt head 2 with respect to the bolt bearing surface 8 is deemed to correspond to the state where the bolt head 2 is moving in parallel with the bolt bearing surface 8 while contacting it, that is, the state where the bolt head 2 slides parallel to the bolt bearing surface 8. If the parallel movement of the bolt head 2 with respect to the bolt bearing surface 8 is confirmed to have started at step 203, the routine proceeds to step 204.

At step 204, a lateral load due to displacement control is imparted by the lateral load controlling means to the bolt head 2 while the fastening rotational torque imparting means fastens the bolt. Further, the change in the lateral load when the bolt is fastened is monitored. Here, the lateral load due to the displacement control is the lateral load controlled so that the amount of parallel movement of the bolt head 2 with respect to the bolt bearing surface 8 per unit time, that is, the amount of displacement, becomes constant. That is, the amount of parallel movement of the bolt head 2 with respect to the bolt bearing surface 8 per unit time, that is, the lateral load, is controlled by the lateral load controlling means so that the amount of displacement becomes constant. In this embodiment, the parallel movement of the bolt head 2 with respect to the bolt bearing surface 8 after the parallel movement of the bolt head 2 with respect to the bolt bearing surface 8 has confirmed to be started is assumed to correspond to the parallel movement of the socket 7 with respect to the bolt bearing surface 8. The lateral load controlling means controls the lateral load so that the amount of the parallel movement of the socket 7 with respect to the bolt bearing surface 8 per unit time detected by the displacement detection sensor 137 becomes constant. The bolt is fastened by the fastening rotational torque imparting means. Further, the change of the lateral load when the bolt is fastened is monitored by the lateral load controller 135 of the lateral load controlling means.

At step 205 following step 204, whether the parallel movement of the bolt head 2 with respect to the bolt bearing surface 8 has stopped during fastening of the bolt at step 204 is judged. Whether the parallel movement of the bolt head 2 with respect to the bolt bearing surface 8 has stopped may be judged based on the detection information from the displacement sensor 137 by the displacement detecting means or may be judged from the existence of any rapid changes in lateral load under displacement control.

At step 205, if the parallel movement of the bolt head 2 with respect to the bolt bearing surface 8 is confirmed to have stopped during fastening of the bolt, the routine proceeds to step 206, where the lateral load controlling means performs control to change the direction of imparting the lateral load to the bolt head 2. In this embodiment, it performs control to reverse the direction of the lateral load imparted to the bolt head 2 and make it a direction completely reverse from the direction in which the lateral load had been imparted up to then. Due to this, when fastening a bolt, it becomes possible to intentionally bias the surface pressures of the thread surface and the bolt bearing surface and fasten the bolt in the state with the bolt head 2 sliding in parallel with the bolt bearing surface 8.

When it is confirmed at step 205 that the parallel movement of the bolt head 2 with respect to the bolt bearing surface 8 has not stopped, the routine proceeds to step 207, where whether the fastening rotational torque of the bolt has reached a predetermined value or not is judged by the rotation controller 132 of the fastening rotational torque imparting means. When it is judged that the fastening rotational torque of the bolt has reached the predetermined value, the control routine is ended.

FIG. 13 is a view showing an example of parallel movement of the socket 7 with respect to the bolt bearing surface 8 when the control routine of the bolt fastening shown in FIG. 12 is executed, that is, the trend in displacement along with time.

The a region shown in FIG. 13 corresponds to displacement of the socket 7 at step 202. When the socket 7 is fit over the bolt head 2 and the socket 7 is given a lateral load parallel to the bolt bearing surface 8, first the socket 7 is rapidly moved with respect to the bolt head 2 until the clearance between the engagement surfaces of the bolt head and the socket 7 engaging with the bolt head disappears. Further, when the engagement surfaces of the bolt head 2 and socket 7 engaging with the bolt head 2 contact, parallel movement of the socket 7 with respect to the bolt bearing surface temporarily stops until the parallel movement of the bolt head 2 with respect to the bolt bearing surface 8, that is, the sliding, starts.

The b region shown in FIG. 13 corresponds to step 203 to step 204. In the b region, a lateral load due to displacement control is imparted by the lateral load controlling means to the bolt head 2, the bolt head 2 is made to slide in parallel to the bolt bearing surface 8, and the fastening rotational torque imparting means fastens the bolt. Accordingly, the parallel movement of the socket 7 with respect to the bolt bearing surface per unit continues constant.

The c region shown in FIG. 13 corresponds to the case in step 205 where the parallel movement of the bolt head 2 with respect to the bolt bearing surface 8 is confirmed to have stopped. This state includes for example the case where the lateral load is excessively imparted to the bolt head 2, so the bolt shank is strongly pushed against the rim of the bolt hole provided in a fastened member and parallel movement of the bolt head 2 with respect to the bolt bearing surface 8 stops.

The d region shown in FIG. 13 corresponds to step 206. If, during fastening of the bolt, the parallel movement of the bolt head 2 with respect to the bolt bearing surface 8 is confirmed to have stopped, control is performed so that the direction of the lateral load imparted to the bolt head 2 is reversed and made a direction completely opposite to the direction of the lateral load given up to then. Accordingly, the parallel movement of the socket 7 with respect to the bolt bearing surface 8 becomes movement reverse to the b region.

According to the sixth embodiment for realizing the bolt fastening method of the present invention explained above with reference to FIG. 11 to FIG. 13, when fastening a bolt, it becomes possible to intentionally bias the surface pressures of the thread surface and the bolt bearing surface and fasten the bolt in the state where the bolt head is sliding in parallel to the bolt bearing surface. Due to this, for example, it is possible to prevent a lateral load from being excessively imparted to the bolt head and therefore the bolt shank from strongly being pushed against the rim of a bolt hole provided in the fastened member and therefore unexpectedly large friction from being generated due to the surface conditions of the contact part between the bolt shank and the rim of the bolt hole. Further, it is possible to further reduce the fastening rotational torque required when fastening a bolt and possible to further increase the axial force of the bolt generated when fastening a bolt.

The invention claimed is:

1. A bolt fastening method for a bolt having a bolt head and a bolt shank provided with an external thread to fasten members, the members including a first member having a bolt bearing surface, the bolt fastening method comprising:
imparting a lateral load to the bolt head in a direction that is parallel to the bolt bearing surface causing the bolt head to incline with respect to the bolt bearing surface; and
while the bolt head is inclined with respect to the bolt bearing surface, imparting a rotational torque rotating the bolt head so as to fasten the bolt;
wherein the lateral load imparted to the bolt head in the direction that is parallel to the bolt bearing surface of the first member is imparted such that the inclination of the bolt center axis with respect to the bolt bearing surface is held at a predetermined angle in a single plane while the rotational torque is being imparted.

2. A bolt fastening method as set forth in claim 1, further comprising:
making a center axis of an internal thread engaged with the external thread incline with respect to a vertical line of the bolt bearing surface by having particles deposited at parts of the threads of the internal thread.

3. A bolt fastening method as set forth in claim 1, characterized in that
the external thread is formed with the center axis of the external thread inclined with respect to the center axis of the bold head.

4. A bolt fastening method as set forth in claim 1, characterized in that the bolt shank is formed with a hole in part of it to reduce a bending rigidity of the bolt shank with respect to the lateral load.

5. A bolt fastening method for a bolt having a bolt head and a bolt shank provided with an external thread to fasten members, the members including a first member having a bolt bearing surface, the bolt fastening method comprising:
imparting a lateral load to the bolt head in a direction that is parallel to the bolt bearing surface causing the bolt head to incline with respect to the bolt bearing surface; and
while the bolt head is inclined with respect to the bolt bearing surface, imparting a rotational torque rotating the bolt head so as to fasten the bolt;
wherein the lateral load imparted to the bolt head in the direction that is parallel to the bolt bearing surface of the first member is imparted in a constant direction while the rotational torque is imparted.

6. A bolt fastening method for a bolt having a bolt head and a bolt shank provided with an external thread to fasten members, the members including a first member having a bolt bearing surface, the bolt fastening method comprising:
imparting a lateral load to the bolt head in a direction that is parallel to the bolt bearing surface causing the bolt head to incline with respect to the bolt bearing surface; and
while the bolt head is inclined with respect to the bolt bearing surface, imparting a rotational torque rotating the bolt head so as to fasten the bolt;
wherein while the bolt is being fastened and prior to a rotational torque of the bolt reaching a constant predetermined value, the lateral load imparted to the bolt head in the direction parallel to the bolt bearing surface of the first member is imparted in a first direction, and then imparted in a second direction opposite to the first direction.

* * * * *